United States Patent [19]

Davis

[11] Patent Number: 4,940,357
[45] Date of Patent: Jul. 10, 1990

[54] TORSION SPRING COUPLING

[76] Inventor: Albert W. Davis, 1714 S. Story Rd., Irving, Tex. 75060

[21] Appl. No.: 229,442

[22] Filed: Aug. 8, 1988

Related U.S. Application Data

[63] Continuation-in-part of Ser. No. 99,108, Sep. 21, 1987, abandoned.

[51] Int. Cl.5 ............................................... B25G 3/00
[52] U.S. Cl. ................................... 403/344; 403/229; 403/311; 29/402.09
[58] Field of Search ............... 403/286, 229, 299, 296, 403/310, 311, 313, 344; 29/173, 402.09

[56] References Cited

U.S. PATENT DOCUMENTS

| 312,241 | 2/1885 | Farmer | 464/57 |
|---|---|---|---|
| 370,168 | 9/1887 | Truxal | 403/344 |
| 2,340,300 | 2/1944 | Booth | 237/117 |
| 2,960,851 | 11/1960 | Ciaccio | 15/104.33 X |
| 2,980,417 | 4/1961 | Pence | 267/33 |
| 3,178,036 | 4/1965 | Cardwell | 267/33 |
| 3,370,599 | 2/1968 | Ciaccio | 15/104.33 X |
| 3,779,537 | 12/1973 | Kalister | 267/179 |
| 4,042,305 | 8/1977 | Vincent | 15/104.33 |
| 4,278,836 | 7/1981 | Bingham | 29/402.09 X |

OTHER PUBLICATIONS

Homeowner's Garage Door Repair Manual by Johnson & Davis, 1980, pp. 55-67 & 121.

Primary Examiner—Andrew V. Kundrat
Attorney, Agent, or Firm—Crutsinger & Booth

[57] ABSTRACT

A torsion spring coupling for repairing broken torsion springs including at least two mating semicylindrical segment members securable around a torsion bar. The segments are secured between opposing end segments of a broken torsion spring to form a cylinder having threaded outer circumferential surfaces for threadably engaging opposing segments of a broken torsion spring to prevent relative rotational movement between opposing segments of a broken torsion spring longitudinally along a torsion bar.

6 Claims, 2 Drawing Sheets

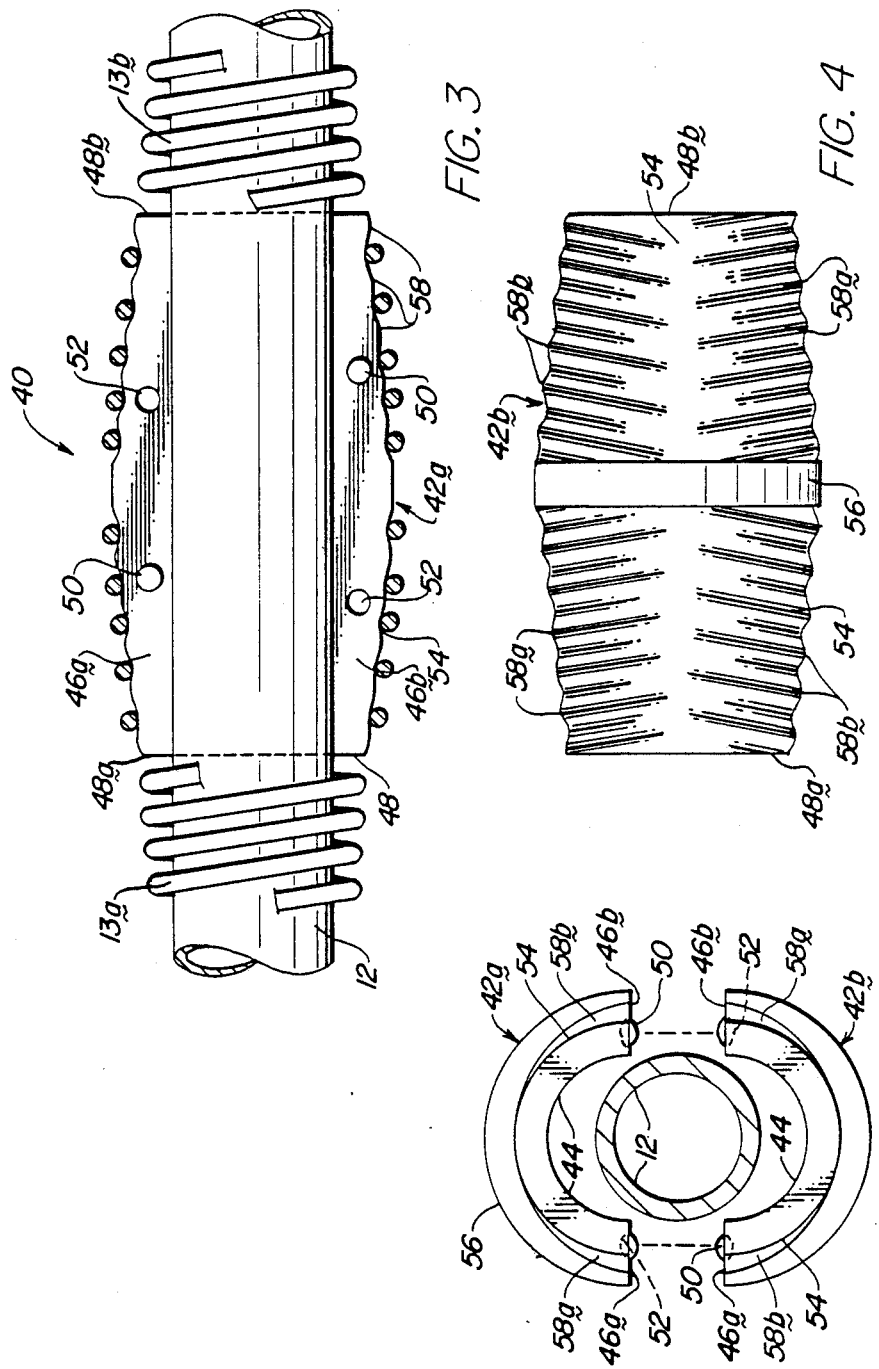

TORSION SPRING COUPLING

This application is a continuation in part of my co-pending Application Serial No. 07/099,108 filed Sept. 21, 1987, entitled "Torsion Springs Repair Couplings Splicer.", now abandoned.

TECHNICAL FIELD

The invention relates to a coupling splicer for use in repairing broken overhead door springs.

BACKGROUND OF THE INVENTION

Conventional overhead doors and sectional garage doors are heavy and rely upon counterbalancing mechanisms to provide for safe and easy manipulation. Various types of counterbalancing mechanisms are described and illustrated in "Homeowner's Garage Door Repair Manual" by Johnson and Davis, published 1980, SBN TXU 38-578.

One common means of counterbalancing overhead doors employs a torsion bar extending through coiled torsion springs and disposed horizontally above the door opening. An end cone and bracket generally anchor one end of the spring to the wall of the building and a winding cone adjustably secures the opposite end of the spring to the torsion bar. Pulley drums attached to the outer ends of the torsion bar receive cables secured to the lower end of the door. As the door is moved to the closed position, the pulley drums and torsion bar are rotated, winding or "loading" the torsion springs. This "loaded" spring force is imparted to the cables and provides a counterbalancing force which enhances the ease with which the otherwise very heavy door may be raised or lowered.

The proper balancing of an overhead door requires that, even when the door is in the open or raised position, the torsion springs be wound or "loaded" to a certain extent. Thus, the torsion springs will be "loaded" at all times.

Metal fatigue may cause torsion springs to break. Conventional methods of repairing a torsion spring counterbalance requires disassembly of the mechanism and immediate replacement of the torsion spring. However, replacement torsion springs are not always immediately available. Additionally, failure of a torsion counterbalance may result in a family car or emergency vehicle being "trapped" inside a garage behind a heavy and virtually immovable door. A method of at least temporarily repairing a broken torsion spring would allow manipulation of the door until replacement springs can be acquired and permanently repaired.

It is an object of the present invention to eliminate the need to disassemble the mechanism and also to eliminate the necessity of immediately replacing a broken torsion spring.

Accordingly, it is a primary aim of the present invention to provide a method and apparatus for repairing broken torsion springs without removing broken torsion springs from the torsion bar. Other objects and advantages of the present invention will be apparent upon reading the following detailed description.

SUMMARY OF THE INVENTION

The method for repairing broken torsion springs on a torsion bar involves coupling opposing segments of the broken torsion spring by positioning a pair of semicircular segments together to form a tubular coupling around the torsion bar and between segments of the broken torsion spring. Opposing broken segments of the torsion spring are secured to opposite ends of the tubular coupling segment such that ends of the coiled spring segments encircle the tube segments such that force can be transmitted from one spring segment to the other through the tubular coupling.

The torsion spring coupling member is formed by positioning two mating semicircular coupling segments, each having a semicircular passage formed therein around a torsion bar without disengaging opposite ends of the bar from bearings.

Tapered outer circumferential surfaces adjacent terminal ends of each coupling segment provide truncated externally threaded cone portions to threadably engage opposing segments of a broken torsion spring. Each mating coupling segment has an alignment pin and a depression for permitting longitudinal alignment of the mating members relative to each other.

In accordance with the invention, there is provided a method and apparatus by which opposing segments of a broken torsion spring may be spliced or coupled together to affect repair of a torsion counterbalance. It is an additional object of the present invention to enable such repairs to be affected without the need for disassembly of the counterbalance.

DESCRIPTION OF THE DRAWINGS

In order that the objects, aims, and features of the invention may be more fully understood, the following drawings are annexed hereto, in which:

FIG. 3 is a partial sectional view of the torsion spring illustrating the relationship to one semicircular segment of the present invention;

FIG. 4 is a front elevation of the torsion spring coupling member of the present invention; and FIG. 5 is an exploded end view of the coupling segments illustrating the method for forming the tubular coupling on the torsion bar.

Like numerical references are employed throughout the drawings to designate like parts.

DETAIL DESCRIPTION OF A PREFERRED EMBODIMENT

Figure 1:
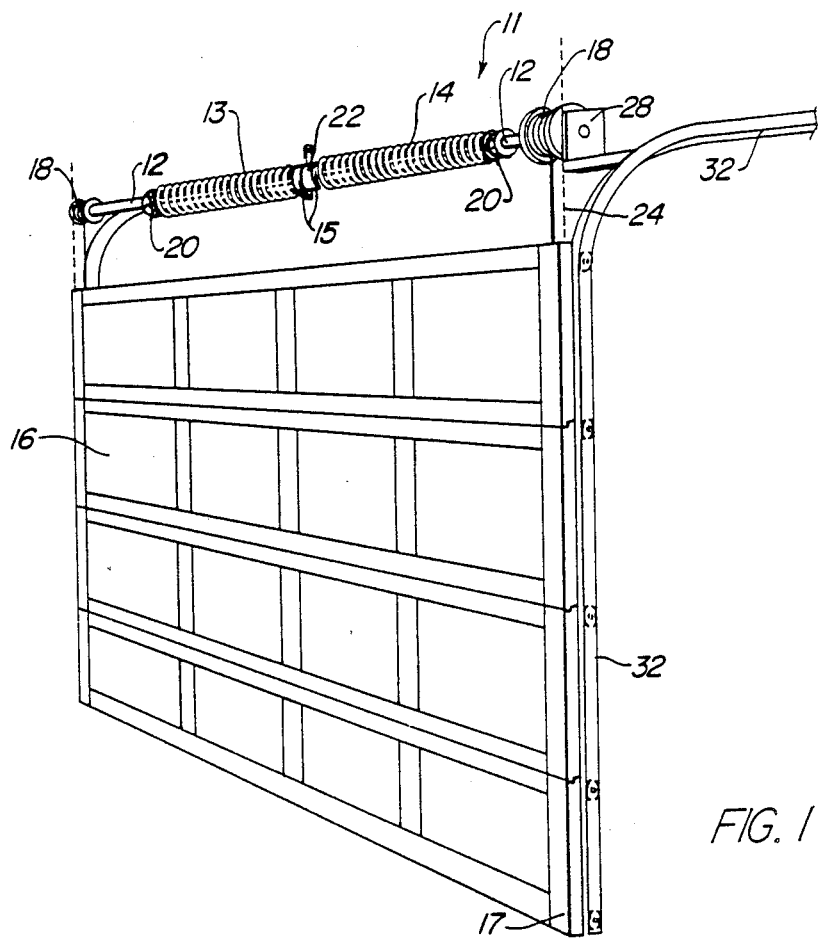
FIG. 1 is a perspective view of an overhead door and counterbalancing mechanism diagrammatically illustrated.
Figure 2:
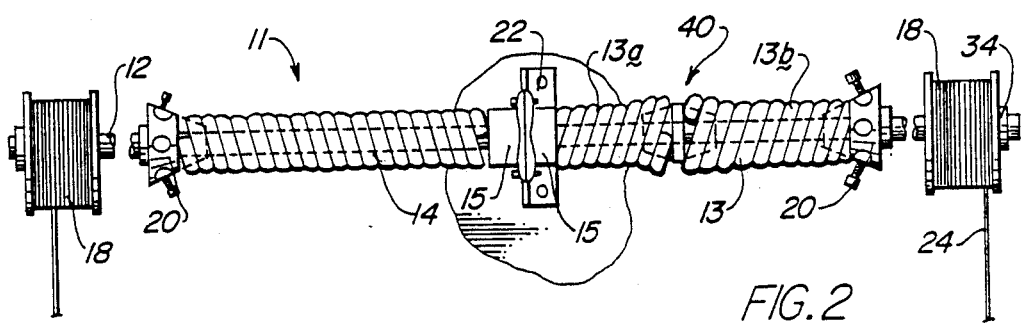
FIG. 2 is a front elevation of a torsion bar and broken spring assembly.

In FIGS. 1 and 2 of the drawing there is diagrammatically illustrated a conventional sectional overhead door 16 having a torsion spring counterbalance generally designated by the numeral 11. Torsion spring counterbalance 11 comprises a torsion bar 12, a left hand wound torsion spring 13 and a right hand wound torsion spring 14, pulley drums 18, two dead end cones 15 anchored by a bracket 22 to the building and winding cones 20 secured to torsion bar 12. Torsion bar 12 is horizontally disposed above door 16 and secured at its ends, for example, by setscrews within drums 18, drums 18 being rotatably secured to drum bearings 34 within drum brackets 28. Drum brackets 28 are secured by suitable connectors, such as screws to the structure wall or ceiling. Intermediate pulley drums 18, torsion springs 13 and 14 are fitted longitudinally around torsion bar 12 and secured between winding cones 20 and dead end cones 15. Each torsion spring is secured between a winding cone 20 and an end cone 15, the two dead end cones having an integral body portion and mounting lug or flange anchored by central support bracket 22. The door 16 and torsion spring balance 11, hereinbefore described, are of conventional design and form no part of the present invention except in combination with the torsion spring splicer hereinafter described. Cables 24 are secured at one end to end drums 18 and secured at the opposite end to the lower portion 17 of door 16. Door 16 travels along a path corresponding to track 32. Torsion springs 13 and 14 are positioned around torsion bar 12 and secured between end cones 15 and winding cones 20. Torsion springs are held in a wound or "loaded" condition between winding cones 20 and end cones 15 for resiliently urging the torsion bar to rotate, turning pulley drums 18, thereby imparting force to cables 24 to counterbalance the weight of door 16. Several methods and apparatus for winding or "loading" torsion springs are well known in the art. Screw type end cones and winding cones are externally threaded and screw into ends of torsion springs for attachment of one end of the spring to a torsion bar and to anchor the other end of the spring to the wall of the building. Screw type double end cones, dead end cones and winding cones are illustrated at page 121 of "Homeowners Garage Door Repair Manual" by Johnson and Davis. Winding cones such as that disclosed in U.S. Pat. No. 3,779,537 issued to Kalister on Dec. 18, 1973 are conventionally employed in torsion counterbalances 11.

Since torsion springs 13 and 14 are subjected to constant stress, metal fatigue inevitably causes the torsion springs to break eventually. A torsion spring counterbalance 11 having a broken torsion spring 13 is illustrated in FIG. 2. Conventional means heretofore employed for repairing a broken torsion spring 13 like that shown in FIG. 2 would require disassembly of the counterbalance 11 and immediate replacement of the torsion spring 13. It is a primary aim of the present invention to permit immediate repair of the counterbalance 11 without disassembly by splicing the opposing segments 13a and 13b of broken torsion spring 13 together.

Turning to FIGS. 3 and 4 of the drawing, there is illustrated the torsion spring coupling member of the present invention generally designated by the numeral 40.

Coupling member 40 comprises a pair of semicircular mating segment members 42a and 42b, each having a semicircular internal passage 44 formed therein to permit positioning mating members 42a and 42b around a central portion of torsion bar 12 when opposite ends of torsion bar 12 are not accessible. Each mating segment member 42a and 42b has substantially flat mating surfaces 46a and 46b adjacent a central semicircular passage 44, said mating surfaces and the longitudinal axis 12a of torsion bar 12 lying in a common plane when surfaces 46a and 46b on segments 42a and 42b are urged together to form tubular coupling 40 on torsion bar 12.

Intermediate the terminal ends 48a and 48b of each mating surface 46a and 46b, there is provided a pin 50 and a depression 52 for permitting longitudinal alignment of mating members 42a and 42b. By way of example, as shown in FIGS. 3–5, pin 50 on mating surface 46a of mating member 42a corresponds to the position of depression 52 on a mating surface 46a of mating member 42b such that when mating members 42a and 42b are fitted around torsion bar 12, pin 50 on mating surface 46a of mating member 42a extends into depression 52 in surface 46a on mating surface 42b, and the substantially flat mating surfaces 46a of mating members 42a and 42b are abutted. Similarly, pin 50 on mating surface 46a of mating member 42b extends into depression 52 on mating surface 46a of mating member 42a. According to a preferred embodiment of the present invention, the distance between pin 50 and depression 52 on mating surfaces 46a of mating members 42a and 42b is less than the distance between pin 50 and depression 52 on mating surfaces 46b of mating members 42a and 42b for ensuring proper alignment of mating members 42a and 42b.

The outer circumferential surfaces 54 of each mating member 42a and 42b are tapered and have an outwardly extending central rib 56 disposed perpendicularly relative to torsion bar 12 such that the circumference of assembled coupling member 40 gradually increases along a path from each terminal end toward central rib 56.

The circumferential surface 54 of each mating member 42a and 42b is provided with external thread segments 58 for screwing coupling member 40 into torsion spring 13. According to a preferred embodiment, universal left hand/right hand threads similar to those disclosed in U.S. Pat. No. 2,340,300 and U.S. Pat. No. 3,779,537 are provided along circumferential surfaces 54 for eliminating the requirement of left hand/right hand orientation to coupling member 40 relative to the opposing segments 13a and 13b of broken torsion spring 13.

The coupling member 40 is substantially tubular having threads 58 disposed along tapered outer circumferential surfaces 54 adjacent each terminal end 48. Threads 58 interrupt the outer circumferential surface 54. As best illustrated in FIG. 4 of the drawing, right hand thread segments 58a and left hand thread segments 58b are formed around approximately 90 degrees of the circumference of semi-circular outer surface 54 adjacent each end 48a and 48b of each coupling segment. As viewed in FIG. 4, right hand thread segments 58a are formed on the lower right hand portion and the upper left hand portion of coupling segment 40. As viewed in FIG. 4, left hand thread segments 58b are formed on the upper right hand end portion and the lower left hand end portion of coupling segment 40. As best illustrated in FIGS. 3 and 5 of the drawing, pins 50 and depressions 52 are spaced such that thread segments 58a on coupling segments 42a and 42b will be aligned to form substantially continuous thread segments around approximately 180 degrees of the tubular coupling which is formed when two coupling segments are secured together. Similarly, pins 50 and depressions 52 position left hand thread segments 58b on each coupling segment 42a and 42b in an aligned relationship. First set of threads 58a threadably engages a right hand wound spring while second set of threads 58b threadably engages a left hand wound spring. Thus each terminal end 48 of coupling member 40 is threadably engageable with either a right hand wound or left hand wound segment of a broken torsion spring 13.

As best shown in FIG. 2 of the drawing, coupling member 40 is fitted around torsion bar 12 between broken segments 13a and 13b of torsion spring 13 such that torsion bar 12 is secured within passage 44 extending through mating members 42a and 42b. Pins 50 on each mating surface 46a and 46b extend into the corresponding depressions 52 on each mating surface 46a and 46b for properly aligning mating members 42a and 42b and aligning threads 58 on the circumferential surfaces of mating members 42a and 42b.

Repair of the broken counterbalance 11 may be accomplished by threadably engaging the terminal ends 48 of coupling member 40 within opposing segments 13a and 13b of broken torsion spring 13. Rotation of conventional winding cone 20 to wind or "load" the spring 13 tightly secures opposing segments 13a and 13b of broken torsion spring 13 around coupling member 40 and imparts the resilient force required to counterbalance door 16. Winding cone 20 is then secured by a set screw (not shown) for preventing movement relative to torsion bar 12 and maintaining torsion spring 13 in the "loaded" or stressed condition.

Thus it is apparent that there has been provided, in accordance with the invention, a torsion spring coupling member that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for repairing broken torsion springs on a torsion bar for coupling opposing segments of the broken torsion spring, comprising the steps of:
   (a) positioning mating surfaces on semi-cylindrical members in juxtaposed relation to form a tubular coupling around the torsion bar and between opposing segments of a broken torsion spring;
   (b) securing opposing segments of the broken torsion spring to opposite ends of the tubular coupling such that ends of the opposing segments of the broken spring are secured together by the tubular coupling and force is transmitted through the coupling from one opposing segment of the broken spring to the other; and
   (c) rotating a winding cone secured to one end of a spring segment to screw the opposite end of the spring segment onto the tubular coupling.

2. A torsion spring coupling member comprising: at least two mating members having mating surfaces, an alignment pin on each mating surface, each mating surface having a depression for permitting longitudinal alignment of said mating members relative to each other to form a tubular coupling member having a central passage; tapered outer circumferential surfaces adjacent terminal ends of said coupling member, said outer circumferential surfaces having external threads for engaging opposing segments of a broken torsion spring to prevent relative longitudinal movement of opposing segments of the torsion spring.

3. A torsion spring ocupling member according to claim 2, said external threads on said outer circumferential surface comprising universal left hand/right hand threads.

4. A torsion spring coupling member comprising: a tubular coupling member including at least two mating members, each having a passage formed therein and adapted to be securable around a torsion bar, said mating members each having mating surfaces; an alignment pin on each mating surface, each mating surface having a pin receiving depression for permitting longitudinal alignment of said mating members relative to each other when a pin on a mating surface of one mating member is positioned in a pin receiving depression of the mating surface on the other mating member; and tapered outer circumferential surfaces adjacent terminal ends of said mating members, said outer circumferential surfaces having universal left hand/right hand threads for engaging opposing segments of a broken torsion spring to prevent relative longitudinal movement of opposing segments of the broken spring.

5. A torsion spring coupling member comprising: at least two mating semi-cylindrical coupling segments, each having a passage formed therein and adapted to be securable around a torsion bar, each of said coupling segments having mating surfaces; an alignment pin on each mating surface, each mating surface having a pin receiving depression for permitting longitudinal alignment of said mating coupling segments relative to each other when a pin on a mating surface of one mating coupling segment is positioned in a pin receiving depression in the mating surface on the other mating coupling segment; and tapered outer semi-circumferential surfaces adjacent terminal ends of each coupling segment, said outer semi-circumferential surfaces having external thread segments for threadably engaging opposing segments of a broken torsion spring.

6. A torsion spring coupling member comprising; two semi-cylindrical members having semi-circular internal passages connectable to form a tubular coupling member having a central passage, each semi-cylindrical member having first and second mating surfaces; an alignment pin on each of said first and second mating surfaces, each of said first and second mating surfaces having a pin receiving depression adapted to receive an alignment pin on an abutting semi-cylindrical member, the distance between said alignment pin and said pin receiving depression on said first mating surface being less than the distance between said alignment pin and said pin receiving depression on said second mating surface for insuring proper alignment of said semi-cylindrical members; tapered outer circumferential surfaces adjacent terminal ends of said coupling member; and means on said tapered outer surfaces for engaging opposing segments of a broken torsion spring to prevent relative longitudinal movement of opposing segments of the broken spring.

* * * * *

UNITED STATES PATENT AND TRADEMARK OFFICE
CERTIFICATE OF CORRECTION

PATENT NO. : 4,940,357
DATED : July 10, 1990
INVENTOR(S) : Albert W. Davis

It is certified that error appears in the above-identified patent and that said Letters Patent is hereby corrected as shown below:

Column 2, line 38, after "semicircular" insert
-- coupling --

Column 5, line 55, change "ocupling" to read -- coupling --

Signed and Sealed this

Ninth Day of July, 1991

Attest:

HARRY F. MANBECK, JR.

Attesting Officer

Commissioner of Patents and Trademarks